United States Patent Office 3,262,915
Patented July 26, 1966

3,262,915
ORGANO-TIN POLYESTERS
Emil F. Jason and Ellis K. Fields, Chicago, Ill., assignors to Standard Oil Company, Chicago, Ill., a corporation of Indiana
No Drawing. Filed July 17, 1962, Ser. No. 210,566
21 Claims. (Cl. 260—61)

This invention relates to synthetic polymeric organotin compositions and to a method of making the same. More particularly, it relates to polyesters containing tin.

The polymeric organo-tin compositions of this invention can be generally designated as the condensation products of a bisphenol, an organo-tin compound and a dicarboxylic acid. More particularly, the tin-containing polyesters of this invention are the condensation products of a bisphenol and a mixture of a diorgano-tin dihalide and an acyl halide of a dicarboxylic acid of the group consisting of alkanedioic acids having from 2 to 20 carbon atoms, benzene dicarboxylic acids and naphthalene dicarboxylic acids, which mixture contains from 1 to 99 mole percent, preferably 5 to 20 mole percent, of the diorgano-tin dihalide.

The polyesters containing tin of this invention are linear polymers with a small amount of cross-linking wherein tin is an integral part of, and randomly distributed in, the main polymer chain. These compositions exhibit good thermal stability and fire retarding properties and are suitable for use as stabilizers in polyvinyl chloride plastics, as wood preservatives, in the treatment of textiles for imparting insect resistance and fire retardancy properties thereto, and as surface coatings.

The bisphenol reactant used in preparing the polyesters containing tin of this invention are represented by the formula

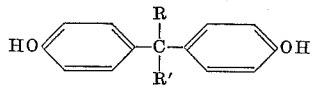

in which R and R' represent alkyl radicals containing 1 to 4 carbon atoms, and are generally referred to as di-(4-hydroxyphenyl) alkylidenes or as n,n-bis-(4-hydroxyphenyl) alkanes. Exemplary of these bisphenols are 2,2-bis(4-hydroxyphenyl) propane; 2,2-bis(4-hydroxyphenyl) butane; the 2,2-, 3,3-bis-(4-hydroxyphenyl) pentanes and hexanes; the 2,2-, 3,3-, 4,4-bis-(4-hydroxyphenyl) heptanes and octanes; and the 2,2-, 3,3-, 4,4-, 5,5-bis-(4-hydroxyphenyl) nonanes.

The diorgano-tin compound used in preparing the compositions of this invention are the diorgano-tin dihalides represented by the formula

wherein $R_1$ represents alkyl and aryl radicals, and X represents halogen, preferably chlorine and bromine. Illustrative organo-tin compounds are dimethyltin dichloride, ethylmethyltin dichloride, diphenyltin dichloride, isopropyl-2-naphthyltin dichloride, dinaphthyltin dibromide and dialkyltin dichloride, containing from about 1 to about 20 carbon atoms in each alkyl group.

The dicarboxylic acid reactant is an acyl halide represented by the formula

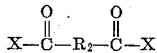

wherein $R_2$ is an alkyl radical having from 2 to about 20 carbon atoms, the phenyl radical and the naphthyl radical; and X represents a halogen, preferably chlorine or bromine. Exemplary of the alkanedioic acids are succinic, adipic and sebacic. The benzene dicarboxylic acids are phthalic, isophthalic and terephthalic acids. Representative of the naphthalene dicarboxylic acids are 1,8-naphthalene dicarboxylic acid, 2,6-naphthalene dicarboxylic acid and 2,7-naphthalene dicarboxylic acid.

The polymeric organo-tin compositions of this invention are prepared by reacting (A) a bisphenol and (B) a mixture of a diorgano-tin dihalide and an acyl halide of a dicarboxylic acid of the group consisting of alkanedioic acids having from about 2 to 20 carbon atoms, benzene dicarboxylic acids and naphthalene dicarboxylic acids, which mixtures contain from 1 to 99 mole percent of diorgano-tin dihalide in the presence of an aqueous alkali metal hydroxide solution. The alkali metal hydroxide can be sodium hydroxide, potassium hydroxide, lithium hydroxide, with sodium hydroxide being preferred. Inasmuch as this is an interfacial condensation in an aqueous solution with the elimination of halogen from the reactants, the alkali metal hydroxide solution contains at least one mole of alkali metal hydroxide per gram atom of halide present in the reaction mixture. Reactants A and B above are preferably in equimolar proportions. However, an excess of either reactant is possible when additional reaction sites are desired in the reaction product obtained in accordance with this invention.

The interfacial condensation polymerization of this invention is preferably conducted by dissolving the bisphenol in the aqueous alkali metal hydroxide solution and thereafter adding a mixture of the diorgano-tin dihalide and acyl halide dissolved in an inert organic solvent such as chloroform to the vigorously agitated aqueous bisphenol alkali metal hydroxide solution at temperatures within the range of from about 0° to about 200° C., preferably 20 to 30° C., and from atmospheric pressure to super-atmospheric pressures of up to about 500 pounds per square inch. At temperatures above 100° C., the reaction should be conducted at super-atmospheric pressures to prevent the loss of water from the reaction medium. The use of elevated temperatures is dependent upon the stability of the reactants. Temperatures below 20° C. reduce the rate of reaction. At room temperature or temperatures within the range of 20 to 30° C., there is maximum reactivity of the reactants with minimal side reactions. The tin-containing polyester condensation products form immediately as solid materials upon the addition of the diorgano-tin dihalide and acyl halide mixture to the aqueous bisphenol alkali metal hydroxide solution. Consequently, it is advisable to slowly add the diorgano-tin dihalideacyl halide mixture to the aqueous solution. This polycondensation reaction can be effected by simply admixing the reactants in a high-speed blender, such as a "Waring Blendor." Preferentially the solvent solution of mixture B is within the range of 5 to 75% by weight of the reactants and preferably 15 to 30% by weight. The aqueous alkali hydroxide solution preferably contains 5 to 20% by weight of the alkaline metal hydroxide and 5 to 40% by weight of the bisphenol.

Recovery of the polymeric organo-tin compositions is simply effected by filtering the solids from the reaction mixture. The solids are then washed with water and dried.

The following examples further illustrate the preparation of the tin-containing polyesters of this invention.

Example 1

A solution of 1.6 g. (0.04 mole) of sodium hydroxide, and 3.6 g. (0.016 mole) of 2,2-bis-(4-hydroxyphenyl) propane (commercial Bis-Phenol A), and 100 ml. of water was prepared in a high-speed blender (Waring Blendor). To this vigorously agitated solution was slowly added a mixture of 3 g. (0.015 mole) of terephthaloyl chloride and 1 g. (0.005 mole) of dimethyltin dichloride in 100 ml. chloroform. A precipitate of finely divided white solids formed immediately. The reaction mixture, upon completion of the addition of the chloroform solution of the terephthaloyl chloride and dimethyltin dichloride, was filtered. The separated solids were washed with water and dried, giving a colorless polyester product having a melting point of 290–293° C., and containing 2.48% tin as determined by emission spectroscopy measurements.

*Example II*

To a vigorously agitated solution of 3.6 g. (0.016 mole) 2,2-bis-(4-hydroxyphenyl) propane in 100 ml. of water containing 0.8 g. (0.02 mole) sodium hydroxide, was slowly added a mixture of 1.9 g. (0.006 mole) diphenyltin dichloride and 1.9 g. (0.009 mole) of terephthaloyl chloride in 100 ml. of chloroform. Finely divided white solids formed immediately during the addition of the solution of terephthaloyl chloride and diphenyltin dichloride to the bisphenol solution. After all of the solvent solution of the terephthaloyl chloride and the diphenyltin dischloride was aded, the reaction mixture was filtered. The precipitate was washed with water and dried, giving a colorless polyester which slowly decomposed at 360° C.

Pellets of the polymeric compositions of Examples I and II were ignited in a Bunsen flame and found to be self-extinguishing when removed from the flame.

It will be apparent to one skilled in the art that the polymeric organo-tin compositions of this invention are primarily linear polyesters containing tin and having the following groups

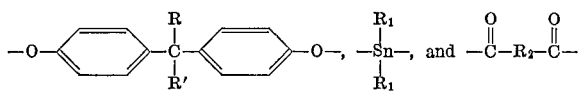

randomly distributed throughout the backbone of the composition.

Thus, having described the invention, what is claimed is:

1. Solid substantially linear tin-containing polyester compositions composed of the condensation product obtained by reacting substantially equimolar proportions of (A) a bisphenol having the formula

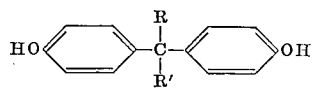

in which R and R' represent alkyl radicals containing 1 to 4 carbon atoms, and (B) a mixture of (a) a diorganotin dihalide having the formula

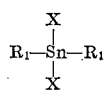

wherein $R_1$ is a member of the group consisting of $C_{1-20}$ alkyl, phenyl and naphthyl, and X represents halogen, and (b) an acyl halide of a dicarboxylic acid from the group consisting of alkanedioic acids having from 2 to about 20 carbon atoms, benzene dicarboxylic acids and naphthalene dicarboxylic acids, said mixture (B) containing from 1 to 99 mole percent of said diorganotin dihalide, in an aqueous alkali metal hydroxide solution containing at least 1 mole of said hydroxide per gram atom of halogen present in reactant (B).

2. The composition of claim 1 wherein said diorganotin dihalide is a dialkyltin dihalide containing from 1 to about 20 carbon atoms in each alkyl group.

3. The composition of claim 1 wherein said diorganotin dihalide is dimethyltin dichloride.

4. The composition of claim 1 wherein said diorganotin dihalide is a diphenyltin dihalide.

5. The composition of claim 1 wherein said diorganotin dihalide is diphenyltin dichloride.

6. The composition of claim 1 wherein said bisphenol is 2,2-bis(4-hydroxyphenyl) propane.

7. The composition of claim 1 wherein said acyl halide is terephthaloyl chloride.

8. The composition of claim 1 wherein said acyl halide is adipoyl chloride.

9. Solid substantially linear tin-containing polyester compositions composed of the condensation product obtained by reacting substantially equimolar proportions of (A) 2,2-bis(4-hydroxyphenyl) propane and (B) a mixture of (a) a diorganotin dihalide of the group consisting of dimethyltin dichloride and diphenyltin dichloride, and (b) terephthaloyl chloride, said mixture (B) containing from about 25 to about 40 mole percent of said diorganotin dichloride, in an aqueous sodium hydroxide solution containing at least 1 mole of sodium hydroxide per gram atom of chloride present in reactant mixture (B), at a temperature within the range of from about 20 to about 30° C.

10. The composition of claim 9 wherein reactant B is a mixture of about 25 mole percent dimethyltin dichloride and about 75 mole percent terephthaloyl chloride.

11. The composition of claim 9 wherein reactant B is a mixture of about 40 mole percent diphenyltin dichloride and about 60 mole percent terephthaloyl chloride.

12. A method of preparing solid substantially linear tin-containing polyester compositions which comprises condensing substantially equimolar proportions of (A) a ganotin dihalide having the formula

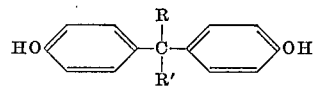

in which R and R' represent alkyl radicals containing 1 to 4 carbon atoms, and (B) a mixture of (a) a diorganotin dihalide having a formula

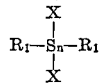

wherein $R_1$ is a member of the group consisting of $C_{1-20}$ alkyl, phenyl and naphthyl, and X represents halogen, and (b) an acyl halide of a dicarboxylic acid from the group consisting of alkanedioic acids having from 2 to about 20 carbon atoms, benzene dicarboxylic acids and naphthalene dicarboxylic acids, said mixture (B) containing from 1 to 99 mole percent of said diorganotin dihalide, in an aqueous alkali metal hydroxide solution containing at least 1 mole of said hydroxide per gram atom of halogen present in reactant (B); and recovering said organotin compound.

13. The method of claim 12 wherein said bisphenol is 2,2-bis(4-hydroxyphenyl) propane.

14. The method of claim 12 wherein said alkali metal hydroxide is sodium hydroxide.

15. The method of claim 12 wherein said diorganotin dihalide is a dialkyltin dihalide containing from 1 to about 20 carbon atoms in each alkyl group.

16. The method of claim 12 wherein said diorganotin dihalide is dimethyltin dichloride.

17. The method of claim 12 wherein said diorganotin dihalide is a diphenyltin dihalide.

18. The method of claim 12 wherein said diorganotin dihalide is diphenyltin dichloride.

19. The method of claim 12 wherein said bisphenol is 2,2-bis(4-hydroxyphenyl) propane.

20. The method of claim 12 wherein said aqueous alkali metal hydroxide solution contains at least 1 mole of alkali metal hydroxide per gram atom of halide present in said reactant mixture (B).

21. A method of preparing solid substantially linear tin-containing polyester compositions which comprises reacting substantially equimolar proportions of (A) 2,2-bis(4-hydroxyphenyl) propane and (B) a mixture of (a) a diorganotin dihalide of the group consisting of dimethyltin dichloride and diphenyltin dichloride and (b) terephthaloyl chloride, said mixture (B) containing from about 25 to about 40 mole percent of said diorganotin dichloride, in an aqueous sodium hydroxide solution containing at least 1 mole of sodium hydroxide per gram atom of chlorine present in reactant mixture (B), at a temperature within the range of from about 20 to about 30° C.; and recovering said organotin composition.

References Cited by the Examiner

UNITED STATES PATENTS

| | | | |
|---|---|---|---|
| 2,715,111 | 8/1955 | Weinberg | 260—429.7 |
| 3,122,576 | 2/1964 | Jason et al. | 260—429.7 |

OTHER REFERENCES

Conix, Ind. Eng. Chem. vol. 51, p. 147–150, February 1959.

Andrews et al., J.A.C.S. vol. 80, p. 4102–4106, Aug. 5, 1958.

WILLIAM H. SHORT, *Primary Examiner.*

J. C. MARTIN, *Assistant Examiner.*

UNITED STATES PATENT OFFICE
CERTIFICATE OF CORRECTION

Patent No. 3,262,915 July 26, 1966

Emil F. Jason et al.

It is hereby certified that error appears in the above numbered patent requiring correction and that the said Letters Patent should read as corrected below.

Column 2, line 50, for "dihalideacyl" read -- dihalideacyl --; column 3, line 22, for "aded" read -- added --; column 4, line 32, for "ganotin dihalide" read -- bisphenol --; line 40, for "a" read -- the --.

Signed and sealed this 1st day of August 1967.

(SEAL)
Attest:

EDWARD M. FLETCHER, JR.
Attesting Officer

EDWARD J. BRENNER
Commissioner of Patents